(12) United States Patent  
Olshvanger et al.

(10) Patent No.: US 7,470,913 B1
(45) Date of Patent: Dec. 30, 2008

(54) HIGH EFFICIENCY AND HIGH HOMOGENEITY LARGE-AREA GAS-FILLED RADIATION DETECTOR

(75) Inventors: Boris Olshvanger, North York (CA); Gregory Bogorodzki, Toronto (CA)

(73) Assignee: Canberra Industries, Inc., Meriden, CT (US)

( * ) Notice: Subject to any disclaimer, the term of this patent is extended or adjusted under 35 U.S.C. 154(b) by 0 days.

(21) Appl. No.: 11/583,482

(22) Filed: Oct. 19, 2006

(51) Int. Cl.
*G01T 1/18* (2006.01)
(52) U.S. Cl. .................................. 250/385.1
(58) Field of Classification Search ............... 250/385.1
See application file for complete search history.

(56) References Cited

U.S. PATENT DOCUMENTS 3,812,358 A * 5/1974 Fletcher et al. .......... 250/385.1
3,934,165 A    1/1976 Meekins
5,192,868 A * 3/1993 Dudley ................. 250/374
5,426,305 A * 6/1995 Siebentritt et al. ......... 250/374
6,452,191 B1 * 9/2002 Johnson et al. .......... 250/385.1

* cited by examiner

*Primary Examiner*—David P Porta
*Assistant Examiner*—Marcus H Taningco
(74) *Attorney, Agent, or Firm*—David W. Carstens; Carstens & Cahoon, LLP

(57) ABSTRACT

In a preferred embodiment, a radiation detector, including: one or more anode wires disposed within a body of the radiation detector, connections to and suspension of the one or more anode wires being made externally of active volume of said radiation detector.

8 Claims, 5 Drawing Sheets

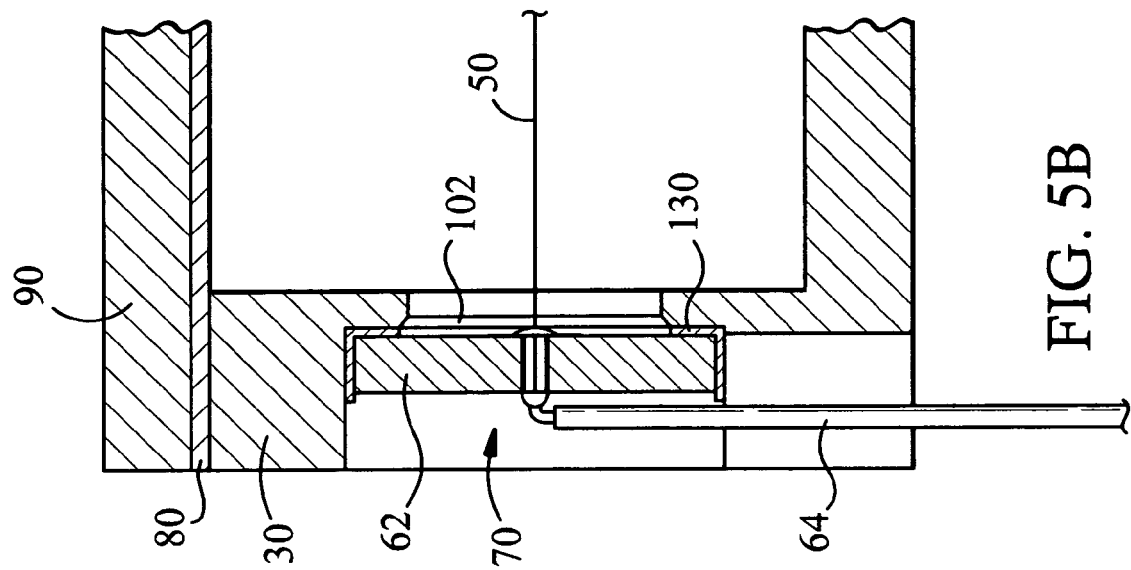
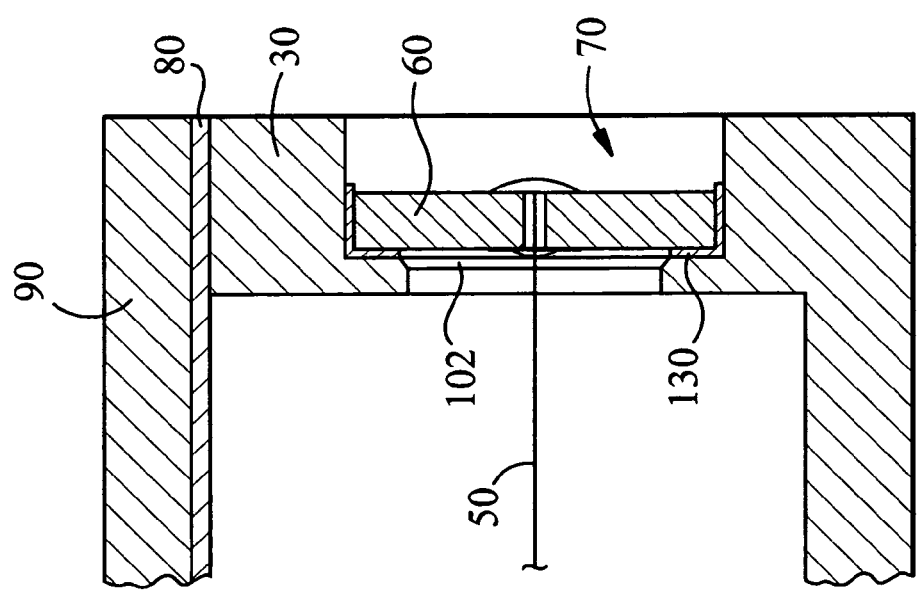
FIG. 5B
FIG. 5A

HIGH EFFICIENCY AND HIGH HOMOGENEITY LARGE-AREA GAS-FILLED RADIATION DETECTOR

BACKGROUND OF THE INVENTION

1. Field of the Invention

The present invention relates to radiation detectors generally and, more particularly, but not by way of limitation, to a novel high efficiency and high homogeneity large-area gas-filled radiation detector.

2. Background Art

All known gas-filled large-area radiation detectors are not free from the problems related to the existence of zones with decreased efficiency. One of the contributing factors is the method of anode wire suspension. The wire suspension system usually uses of some type of holding elements like standoffs, feedthroughs, etc. All these elements are made from dielectric and/or metal parts that are located in the active volume of a detector. Some of these elements have either direct contact with anode wires or are located close to them.

The principle of operation of all gas filled detectors is based on the phenomenon of so-called gas amplification. The uniformity of the detector response depends on the uniformity of the electric field along the anode wires in the active volume of the detector. Presence of wire suspension elements causes distortions of the electric field that leads to the disturbance of gas amplification and consequently to reduction of radiation detection efficiency. This presence creates usually radially symmetric zones around a suspending element that can be 20 mm or more in diameter and that features significantly reduced detection efficiency. Depending on the detector design, the wire supporting elements are mounted either to the bottom of the detector or to its side walls. In the latter case, the efficiency reduction additionally contributes to the detector end effect problem. For a four-wire system (eight wire supporting elements), the total area of decreased efficiency may be 25 cm$^2$ or more. This may potentially cause significant losses of the overall detection efficiency.

In the health physics radiation detection systems that utilize multiple adjacent detectors (for example, in whole body monitors), detector end effects are as critical as problems within the detector volume since they affect the response uniformity of the whole detector array.

An attempt to solve "dead zones" problems is described in U.S. Pat. No. 3,934,165, issued Jan. 20, 1976, to Meekins, and titled PROPORTIONAL COUNTER END EFFECTS ELIMINATOR.

Technical solutions for large area radiation detectors have not been addressed.

Accordingly, it is a principle object of the present invention to provide a radiation detector that has improved detection homogeneity and minimizes dead zones by eliminating anode wire suspending elements and wire connections from the active volume of the detector and by minimizing side wall thickness.

It is a further object of the present invention to provide such a detector that has thin, flat elements made from a dielectric material that are embedded within the detector side walls, and that do not contribute to the wall thickness which elements are used for anode wire support.

It is another object of the present invention to provide such a detector in which these elements feature small center metal pads on both sides and metal plated hole connecting these pads; allowing mounting anode wires to be placed through the holes using soldering techniques or conductive adhesive, sealing at the same time detector volume from the gas leaks.

It is an additional object of the present invention to provide such a detector having these elements supporting anode wires, playing the role of feedthroughs and electrically connecting anode wires in multiwire applications.

It is yet a further object of the present invention to provide such a detector having connections to readout electronics using cables installed in grooves in the side walls of the detector and which do not contribute to the side wall thickness.

It is yet another object of the present invention to provide such a detector having no feedthroughs in the bottom of the detector.

It is yet an another object of the present invention to provide such a detector that has no feedthroughs or other wire supporting parts in the side walls that would extend into the active volume of the detector or beyond the outer surface of the side walls.

It is yet an additional object of the present invention to provide such a detector that has no dielectric materials along the side walls that in some designs are used to suspend anode wires.

A further object of the present invention is to provide such a detector that has no standoffs or studs or any other wire supporting parts mounted on the bottom of detector: either conductive or dielectric.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a radiation detector, comprising: one or more anode wires disposed within a body of said radiation detector, connections to and suspension of said one or more anode wires being made externally of active volume of said radiation detector.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which:

FIGS. 5A and 5B are fragmentary side elevational views, partially in cross-section, taken, respectively taken along lines A-A and B-B of FIG. 4.

DETAILED DESCRIPTION OF THE PREFERRED EMBODIMENTS

Figure 1:
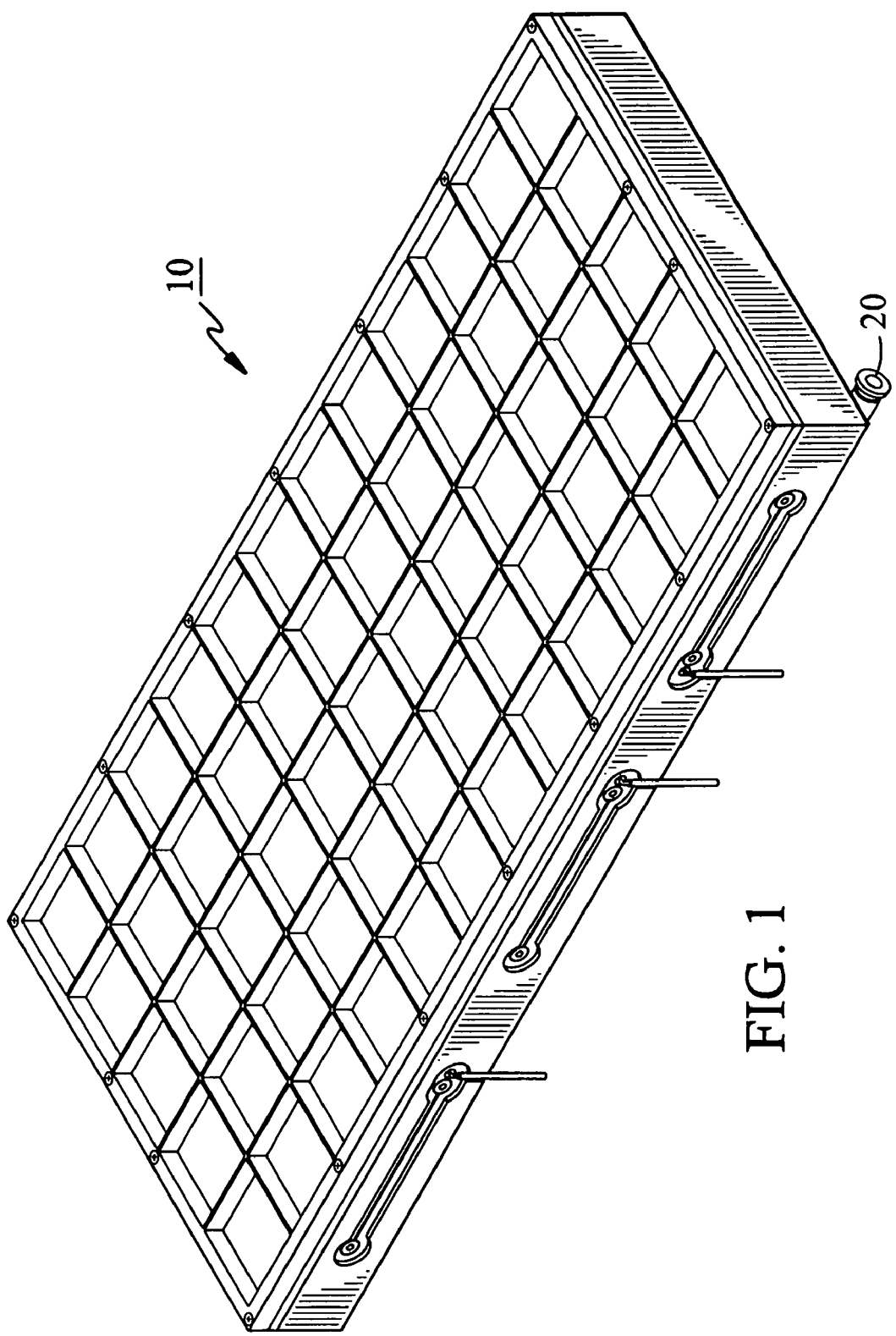
FIG. 1 is an isometric view of an assembled detector constructed according to the present invention.

Reference should now be made to the drawing figures, provided for purposes of illustration only, and on which the figure numerals in parentheses (when used) refer the reader to the figure in which the element(s) being described are more fully shown, although the element(s) may be shown on other figures also.

In general, the present invention is directed to the art of sealed and flow large-area gas-filled beta, alpha, X-ray, and gamma detectors (proportional or GM) and, more particularly, to high efficiency and high homogeneity large-area radiation detectors. These types of detectors are used for example in the health physics applications that utilize multiple detector arrays, like whole body monitors. The improvement in detector design relates to the counting wires suspension system and system of wire connection to the readout electronics.

FIGS. 1, 2, 3A, 3B, 4, 5A, and 5B show design details of the gas proportional flow detector built using the ideas from the present invention. In this case, the detector has three independent sections that are housed in the same detector body, although the detector may have fewer or greater than three sections. The detector body is usually made from a metal using machining, die casting or forming technology. The material selection depends on the technology used and/or on the detection requirements. Plating may be used if surface modification is required. As an alternative metal coated plastic detector bodies may also be used. Choice of the material and technology is driven by the detection requirements of a particular application and by the production volume and cost considerations. Described here innovation may be applied regardless of the detector body material and technology chosen to produce it.

FIG. 1. illustrates a view of the detector assembly in assembled relationship, generally indicated by the reference numeral 10. Detector 10 is shown on FIG. 1 with a gas connection 20 feeding the bottom of the first section. It will be understood that detector 10 has two gas connections only—inlet and outlet (only inlet 20 shown on FIG. 1). The separate sections do not have separate connectors. Gas is supplied to them by special openings in the dividers. The sealed detectors do not have gas connectors at all.

Figure 2:
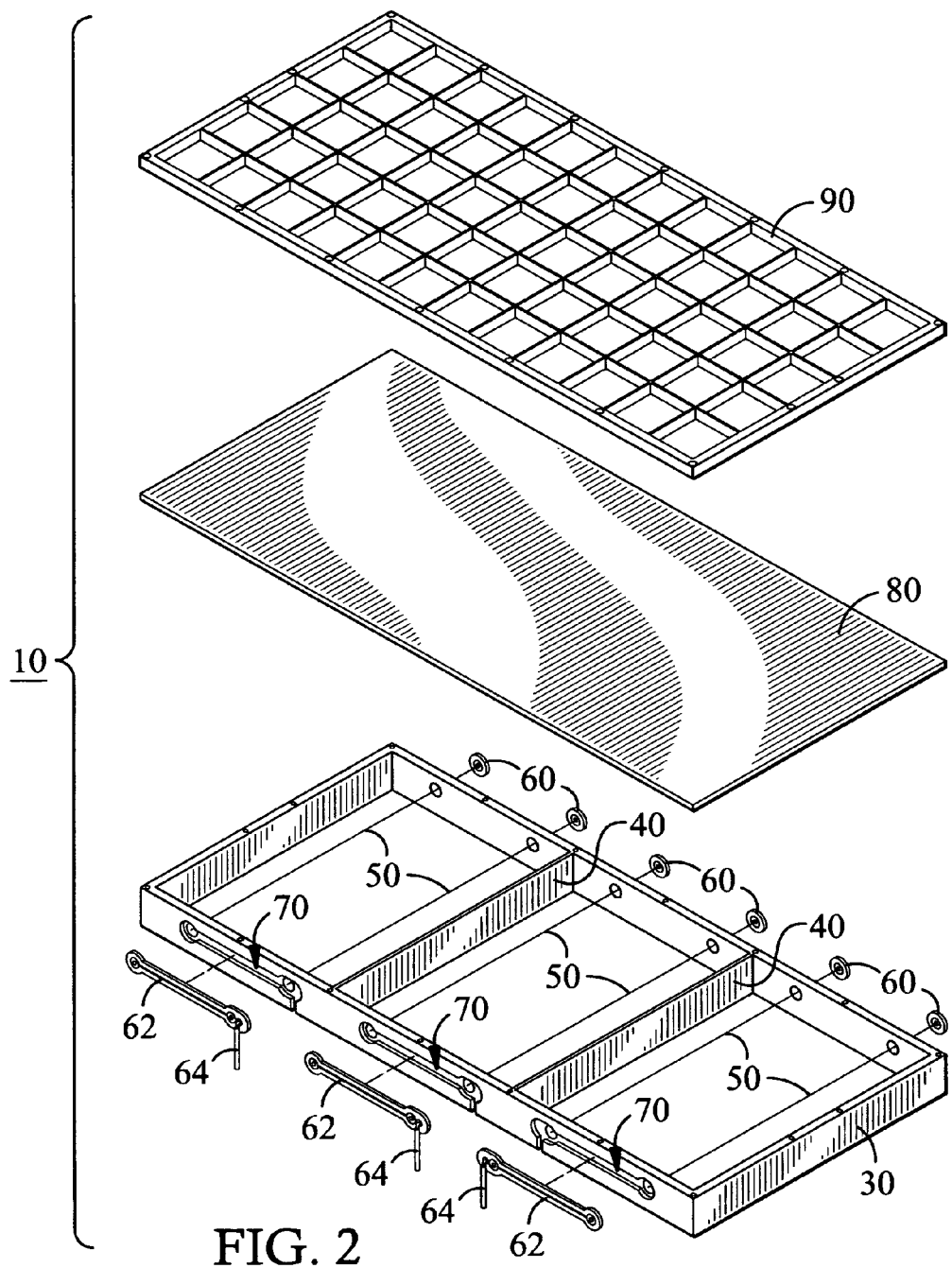
FIG. 2 is an exploded isometric view of the detector of FIG. 1.

FIG. 2 illustrates an exploded view of detector 10. Detector 10 has the body 30 machined, for example, from aluminum, or other suitable material. The three sections of detector 10 are separated by metal dividers 40 to minimize crosstalk between the sections. Each section has two anode wires 50. In this particular implementation, wires 50 are supported by elements (feedthroughs) made from FR-4 fiberglass material: on one side is a single round part 60, while on the other side is a dual element 62 that provides support and interconnection between the wires and the interconnection between the wires and the cables 64 for readout electronics (not shown). Single 60 and dual feedthroughs 62 may be made from a material other than FR-4 provided it has suitable mechanical and electrical properties. Both single 60 and dual feedthroughs 62 are installed in hollows 70 (only hollows for dual feedthroughs 62 shown in FIG. 2) in the side walls shaped to match the shape of the feedthroughs. Epoxy is used to secure the wire support the elements in place and to provide gas tight seal. A window 80 made from a thin metallic foil or metallo-plastic composition hermetically covers the open plane of the body 30 of detector 10. A window support grill 90 of suitable material is placed over window 80 to direct the radiation.

Figure 3A:
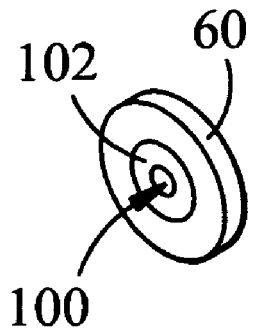
FIG. 3 is an isometric view showing a wire supporting element of the detector of FIG. 1.
Figure 3B:
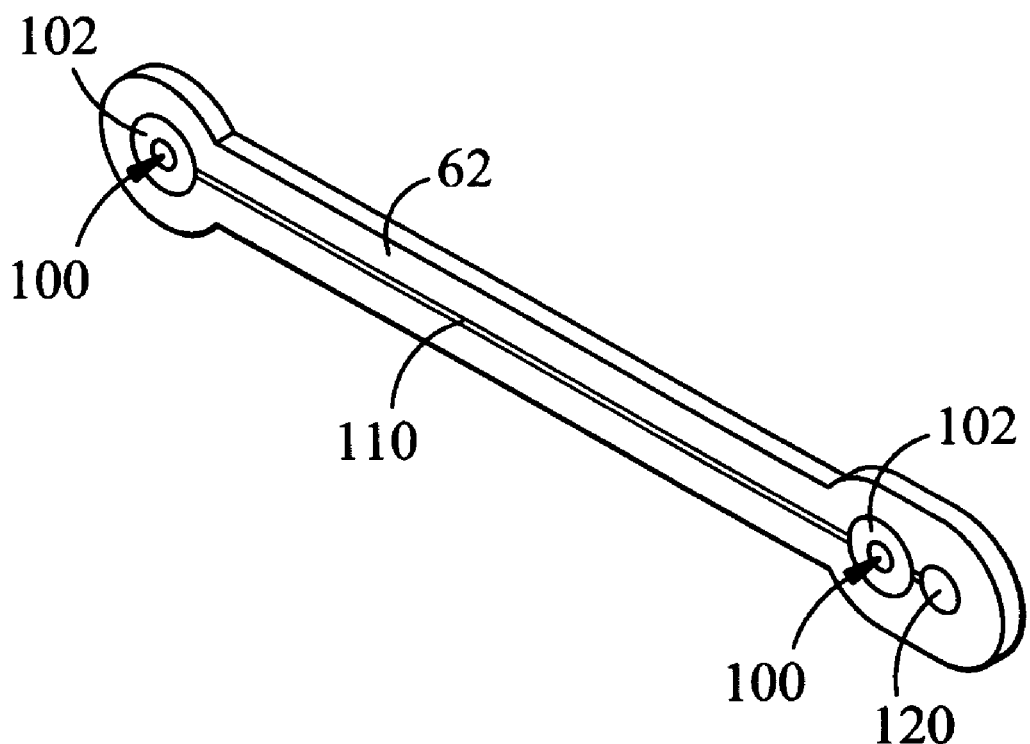

FIGS. 3A and 3B illustrate, respectively, details of feedthroughs 60 and 62. Anode wires 50 (FIG. 2) are installed through metal plated holes 100 that are surrounded on both sides by metal pads 102 (smaller pad size on the inner side). Anode wires 50 are soldered to the metal pads 102; the solder flowing through the metal pads, ensuring an electrical connection and a gas tight seal. An electrically conductive adhesive may be used instead of solder. Dual wire support feedthrough 62 (FIG. 3B) has two holes 100 and metal pads 102 to provide support for two adjacent anode wires 50 (FIG. 2). Trace 110 between the anode wires 50 provides connection between them. Additional pad 120 is for connection of cable 64 to readout electronics.

Figure 4:
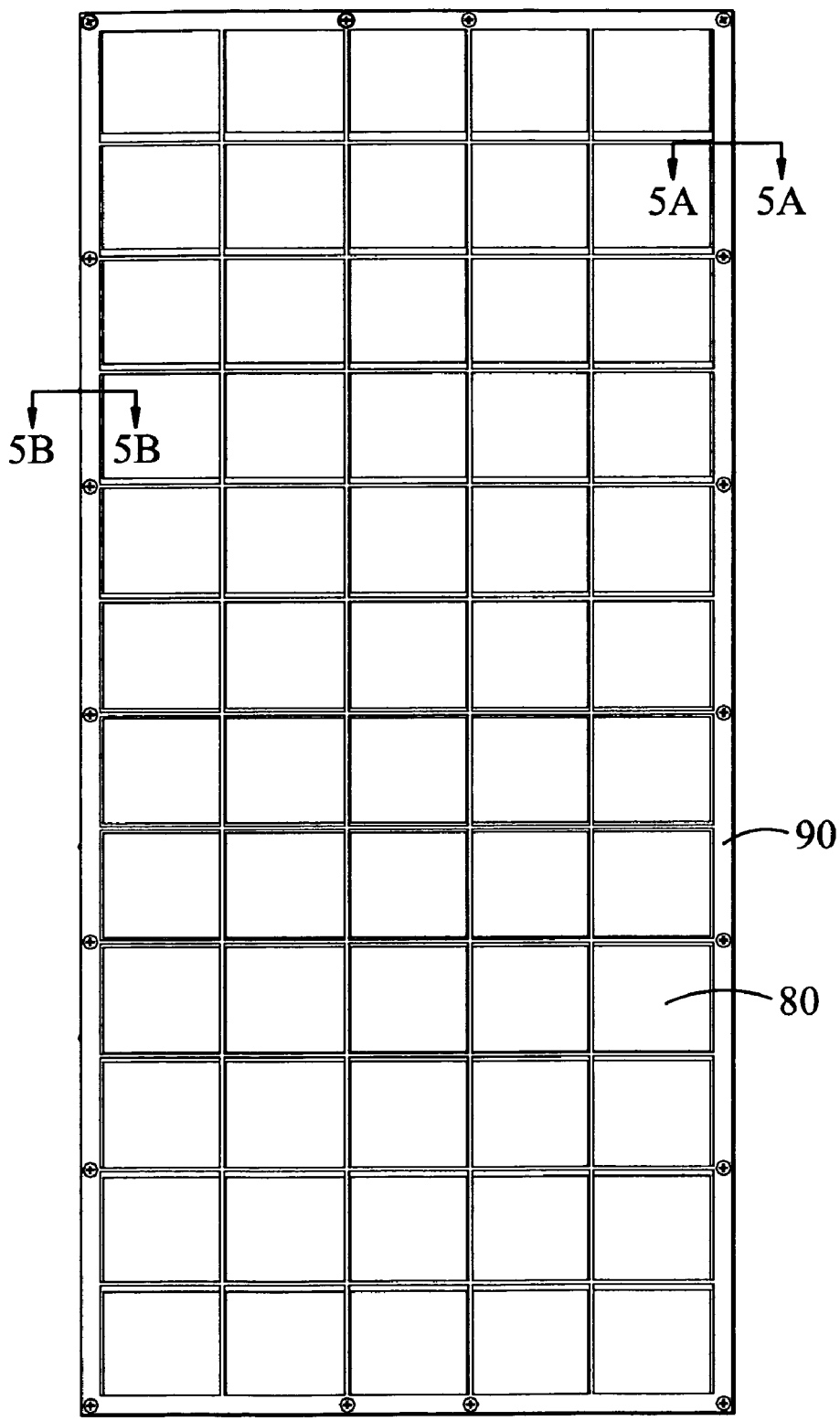
FIG. 4 is a top plan view of the detector of FIG. 1.

FIG. 4 illustrates a top view of detector 10 and shows window 80 and window support grill 90.

FIGS. 5A and 5B illustrate, respectively, details of the mounting of feedthroughs 60 and 62. Feedthroughs 60 and 62 are installed in hollows 70 with epoxy adhesive 130. The thickness of the side walls of the body 30 of detector 10 is usually in the range of at least 5 mm to provide sufficient area to seal detector window 80 and screw mount (screws are not shown for clarity) window support grill 90. At the same time, this wall thickness also provides enough space to embed both anode wire 50 feedthroughs 60 and 62 and readout electronics connecting cable 64 within hollows 70. Anode wires 50 are usually gold plated tungsten, stainless steel or molybdenum. The diameter of wire is usually in the range 0.010 to 0.040 mm—depending on the detector geometry, required gas amplification, bias voltage level etc.

FIGS. 5A and 5B clearly show that feedthroughs 60 and 62 and cable 64 connection for readout electronics are embedded inside the walls of the body 30 and do not protrude beyond its surface on either side. The wire supporting elements and openings in the detector side wall are shown as round only due to the ease of manufacturing process; however, they could also be square, rectangular, oval, etc.

Detectors may be built in the flow or the sealed version. Flow detectors can use thinner window material (usually 0.8 mg/cm$^2$ or even less) that is required to provide sufficient alpha transparency. Thicker window materials (1.5 mg/cm$^2$ and more) are used in sealed detectors to ensure low enough gas permeability.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A radiation detector, comprising:
    (a) a detector body that has spaces on the opposite side walls for mounting wire supporting elements;
    (b) an anode arrangement including one or more anode wires and means for supporting them;
    (c) a window made from a thin metallic foil or metallo-plastic composition and hermetically covering the open plane of said detector body; and (d) said wire supporting elements and cable connection(s) from said one or more anode wires to readout electronics together not protruding beyond said side walls, inside and outside.

2. A radiation detector, as defined in claim 1, wherein: said radiation detector is gas-filled.

3. A radiation detector, as defined in claim 1, wherein: said wire supporting elements have metal pads on both sides and a metallized hole between said metal pads.

4. A radiation detector, as defined in claim 3, wherein: said anode wires are installed through said holes and permanently attached to said metal pads using either a soldering technique or an electrically conductive adhesive.

5. A radiation detector, as defined in claim 1, wherein body of said radiation detector is made from metal or metallized plastic, thickness of the walls is in a range of 2-5 mm.

6. A radiation detector, as defined in claim 1, wherein: depth of said spaces is such that there is a clearance of from about 1 mm to about 2 mm between a top surface of said wire supporting elements are an outer surface of said side wall of said radiation detector.

7. A radiation detector, as defined in claim 1, wherein: an internal active volume of said radiation detector may comprise two or more sections, electrically an optically separated one from another by internal dividers.

8. A radiation detector having side walls, comprising: one or more anode wires disposed within a body of said radiation detector, connections to and suspension of said one or more anode wires being made externally of active volume of said radiation detector, said anode wires and connections not protruding beyond said side walls, inside and outside.

* * * * *